US012791360B2

(12) United States Patent
O'Neil

(10) Patent No.: US 12,791,360 B2
(45) Date of Patent: Nov. 10, 2026

(54) TRANSFORMERLESS DEMODULATION OF SYNCHRO-RESOLVER

(71) Applicant: Hamilton Sundstrand Corporation, Charlotte, NC (US)

(72) Inventor: John O'Neil, Litchfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 244 days.

(21) Appl. No.: 18/813,636

(22) Filed: Aug. 23, 2024

(65) Prior Publication Data

US 2026/0056034 A1 Feb. 26, 2026

(51) Int. Cl.
*G01D 5/20* (2006.01)
*G08C 19/46* (2006.01)
*H04L 25/02* (2006.01)

(52) U.S. Cl.
CPC ........... *G01D 5/2073* (2013.01); *G08C 19/46* (2013.01); *H04L 25/0272* (2013.01)

(58) Field of Classification Search
CPC .... G01D 5/2073; G01D 5/2291; G08C 19/46; H04L 25/0272
USPC ..................................................... 324/207.17
See application file for complete search history.

(56) References Cited

U.S. PATENT DOCUMENTS 5,912,638 A * 6/1999 Vlahu .................. H03M 1/645 341/115
2002/0173932 A1 11/2002 Yoon
2006/0186891 A1 8/2006 Tinebor
2006/0241790 A1* 10/2006 Chen ...................... B62D 5/046 700/66
2008/0272723 A1 11/2008 Rudel et al.
2009/0254295 A1 10/2009 Kobayashi et al.
2010/0097052 A1 4/2010 Lillestolen et al.
2014/0142782 A1* 5/2014 Fu ........................ B60L 3/0084 701/1
2015/0365099 A1 12/2015 Saloio et al.
2016/0102996 A1 4/2016 Benammar
2019/0280537 A1 9/2019 Ikenaga et al.
(Continued)

FOREIGN PATENT DOCUMENTS

CN 106712721 A 5/2017
CN 115733395 A 3/2023
CN 116780965 A 9/2023

OTHER PUBLICATIONS

Hyatt G P: "Solid state synchro-to-digital converter", Nov. 14, 1967; Nov. 14, 1967-Nov. 16, 1967, Nov. 14, 1967 (Nov. 14, 1967), pp. 269-279, XP058362165, DOI: 10.1145/1465611.1465646.
(Continued)

*Primary Examiner* — Roberto Velez
(74) *Attorney, Agent, or Firm* — Kinney & Lange, P.A.

(57) ABSTRACT

Apparatus and associated methods relate to a transformerless way of demodulating signals generated by a synchro-resolver so as to determine a shaft angle of the synchro-resolver. A first differential output voltage between a first pair of the wye-configured secondary windings is used to generate a first output. A second differential output voltage between a second pair of the wye-configured secondary windings, different from the first pair, is used to generate a second output. The first and second outputs are combined to form a signal quadrature to the first output. The first output and the signal quadrature thereto are used to determine the shaft angle.

20 Claims, 6 Drawing Sheets

(56) References Cited

U.S. PATENT DOCUMENTS

| | | | |
|---|---|---|---|
| 2020/0174289 | A1 | 6/2020 | Freudenthal |
| 2020/0271480 | A1 * | 8/2020 | Shaga .................. G01D 5/2053 |
| 2020/0343895 | A1 | 10/2020 | Kobata et al. |
| 2022/0190835 | A1 | 6/2022 | Vor Dem Brocke et al. |
| 2022/0239461 | A1 | 7/2022 | Smith |
| 2026/0056035 | A1 * | 2/2026 | Avritch .................. G01D 5/208 |

OTHER PUBLICATIONS

Extended European Search Report for European Patent Application No. 25197753.4, dated Jan. 19, 2026, 10 pages.

* cited by examiner

TRANSFORMERLESS DEMODULATION OF SYNCHRO-RESOLVER

BACKGROUND

Attitude sensors are used for aircraft navigation. For example, pitch, yaw, and roll are detected, often with redundancy, to provide feedback to pilots and to facilitate navigational control of the aircraft. Synchro-resolvers can be used for such navigational purposes. Synchro-resolvers (or synchros) are a type of transformer whose primary-to-secondary coupling can be varied by physically changing the relative orientation of these windings. The primary winding of the synchro-resolver is usually wound about a rotatable core or rotor and the secondary windings are wound about a fixed core or stator. The secondary windings typically include three wye-configured windings arranged at 120-degree intervals about the rotor. The primary winding is excited by an alternating current, which electromagnetically induces voltages in each of the three wye-configured secondary windings. The voltages induced in the secondary windings and indicative of an angle of the rotor relative to the stator.

In prior art synchro synchro-demodulators, a Scott-T transformer is typically used to convert the three-phase output signals of the synchro-resolver into two quadrature phase sinusoidal signals, from which a shaft angle can be determined. Scott-T transformers are relatively bulky (i.e., large and heavy) electrical components, however, making the synchro-demodulators similarly bulky.

SUMMARY

Some embodiments relate to a method for generating a signal indicative of a shaft angle of a synchro-resolver. In the method, a first differential signal induced between a first output terminal and a second output terminal of a three-phase secondary winding of the synchro-resolver is convolved with a first sine wave having a period and a phase equal to a period and phase of the first differential signal, thereby generating a first convolution result. The magnitude of the first differential signal is then used as a measure of a sine of the shaft angle. A second differential signal induced between the first output terminal and a third output terminal of a three-phase secondary winding of the synchro-resolver is convolved with a first sine wave having a period and a phase equal to a period and phase of the first differential signal, thereby generating a first convolution result. A magnitude of the first differential signal is then determined based on the first convolution result. A measure of a cosine of the shaft angle is created based on a weighted sum of the measures of the magnitudes of the first and second differential signals. The shaft angle is then determined based on the measures of the sine and cosine of the shaft angle.

Some embodiments relate to a synchro-demodulator for generating a signal indicative of a shaft angle of a three-phase synchro-resolver. the synchro-demodulator includes a first analog-to-digital (A/D) converter that receives a first voltage differential between a first output terminal of first secondary windings of the three-phase synchronous resolver and a second output terminal of second secondary windings of the three-phase synchro-resolver. The first A/D converter is further configured to generate a first digitized sampling of the first voltage differential. The synchro-demodulator includes a second A/D converter that receives a second voltage differential between the first output terminal of first secondary windings of the three-phase synchronous resolver and a third output terminal of third secondary windings of the three-phase synchro-resolver. The second A/D converter is further configured to generate a second digitized sampling of the second voltage differential. The synchro-demodulator includes a processor configured to receive the first and second digitized samplings. The synchro-demodulator also includes computer readable memory containing instructions that, when executed by the processor cause the synchro-demodulator to: i) convolving a first differential signal induced between a first output terminal and a second output terminal of a three-phase secondary winding of the synchro-resolver with a first sine wave having a period and a phase equal to a period and phase of the first differential signal, thereby generating a first convolution result; ii) determine a magnitude of the first differential signal based on the first convolution result; iii) use the magnitude of the first differential signal as a measure of sine of the shaft angle; iv) convolving a second differential signal induced between the first output terminal and a third output terminal of a three-phase secondary winding of the synchro-resolver with a second sine wave having a period and a phase equal to a period and phase of the second differential signal, thereby generating a first convolution result; v) determine a magnitude of the first differential signal based on the second convolution result; vi) create a measure of a cosine of the shaft angle based on a weighted sum of the measures of the magnitudes of the first and second differential signals; and vii) determine the shaft angle based on the measures of the sine and cosine of the shaft angle.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to a transformerless way of demodulating signals generated by a synchro-resolver so as to determine a shaft angle of the synchro-resolver. A first differential output voltage between a first pair of the wye-configured secondary windings can be used to generate a first output. A second differential output voltage between a second pair of the wye-configured secondary windings, different from the first pair, can be used to generate a second output. The first and second outputs are combined to form a signal quadrature to the first output. The first output and the signal quadrature thereto are used to determine the shaft angle.

Figure 1:
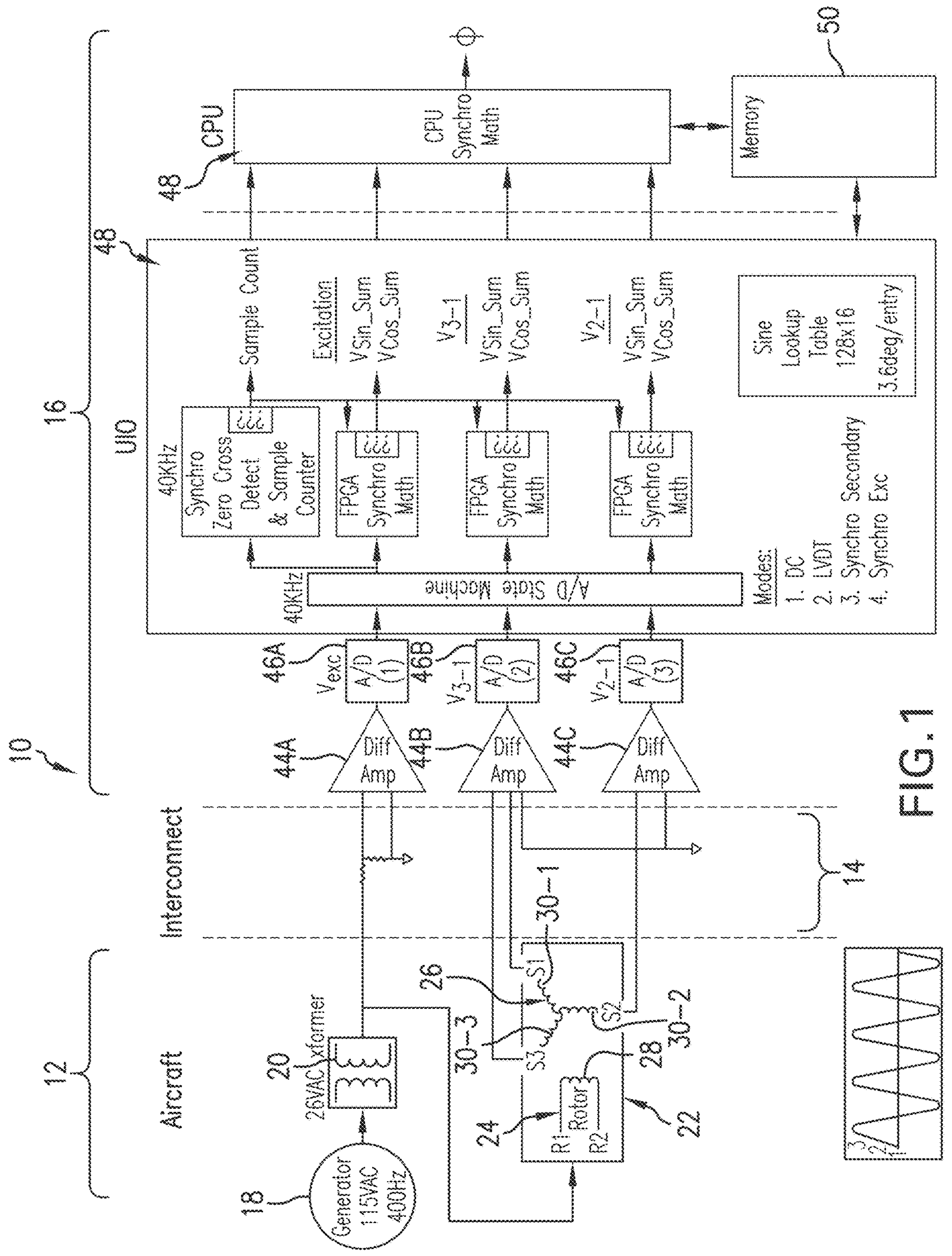
FIG. 1 is a block diagram of an embodiment of an attitude sensing system used on an aircraft.

FIG. 1 is a block diagram of an embodiment of an attitude sensing system used on an aircraft. In FIG. 1, angular position system 10 includes aircraft hardware 12, interconnect 14, and demodulating system 16. Aircraft hardware 12 includes Alternating Current (AC) power generator 18, step-down transformer 20, and synchro-resolver 22. AC power generator 18 can be configured to generate AC power for various AC-powered systems used on an aircraft. Typically, AC power generator 18 generates AC power at a frequency of 400 Hz±20 Hz and an amplitude of 115 V. Step-down transformed 20 can be configured to receive the AC power generated by AC power generator 18 at terminals for primary windings and then generates a lower voltage signal at terminals of secondary windings. The voltage of the AC power output at the terminals of the secondary windings of step-down transformer 20 in accordance with a specification (e.g., within the limits specified) for AC excitation signal for synchro-resolver 22. Such an AC excitation signal is given by:

$$V_{EXC}(t) = V_1 \sin(\omega t) \tag{1}$$

where $V_1$ is the amplitude (typically about 26 VAC) and ω is equal to two-pi (2π) times the frequency f of the excitation signal, which is the same frequency as the 400 Hz AC power signal applied to the primary windings of step-down transformer 20.

Synchro-resolver 22 has rotor 24 and stator 26. Primary windings 28 of synchro-resolver 22 are wound about or located on rotor 24. The AC excitation signal $V_{EXC}(t)$ can be provided across primary windings 28, thereby causing electrical current to flow within primary windings 28. Secondary windings 30-1, 30-2, and 30-3 of synchro-resolver 22 are connected with one another at a common node in a wye configuration. Secondary windings 30-1, 30-2, and 30-3 are oriented on or within stator 26 at 120 degrees of phase separation, one from another. Primary windings 28 and secondary windings 30-1, 30-2, and 30-3 are electromagnetically coupled to one another, thereby facilitating electrical currents to be induced in secondary windings 30-1, 30-2, and 30-3 in response to electrical currents conducted within primary windings 28. Because of the 120-degree phase separation between secondary windings 30-1, 30-2, and 30-3, electrical currents induced therein are indicative of orientation of rotor 24 with respect to stator 26.

Terminal voltages $V_1(t)$, $V_2(t)$, and $V_3(t)$ at terminal ends of the wye-configurated secondary windings 30-1, 30-2, and 30-3 result from the electrical currents induced within secondary windings 30-1, 30-2, and 30-3, respectively. As such, terminal voltages $V_1(t)$, $V_2(t)$, and $V_3(t)$ are similarly indicative of orientation of rotor 24 with respect to stator 26. Terminal voltages $V_1(t)$, $V_2(t)$, and $V_3(t)$ can be measured with respect to voltage at the common node of the wye-configured secondary windings 30-1, 30-2, and 30-3 and then used to determine orientation of rotor 24 with respect to stator 26. In other embodiments, differential voltages $V_{13}(t)$, $V_{32}(t)$, and $V_{21}(t)$ as measured between pairs of terminal ends can be used to determine orientation of rotor 24 with respect to stator 26. First, second, and third differential voltages $V_{13}(t)$, $V_{32}(t)$, and $V_{21}(t)$ are voltage differences between the terminal ends of secondary windings 30-1 and 30-3, between the terminal ends of secondary windings 30-3, and 30-2, and between the terminal ends of secondary windings 30-2 and 30-1, respectively. Such differential voltages are given by:

$$V_{13}(t) = K_1 \cdot V_1 \sin(\theta) \sin(\omega t + \varphi_{13}) \tag{2}$$

$$V_{32}(t) = K_2 \cdot V_1 \sin(\theta + 120°) \sin(\omega t + \varphi_{32}) \tag{3}$$

$$V_{21}(t) = K_3 \cdot V_1 \sin(\theta + 240°) \sin(\omega t + \varphi_{21}) \tag{4}$$

where $K_1$, $K_2$, and $K_3$ are the coupling coefficients between primary winding 28 and secondary windings 30-1, 30-2, and 30-3, respectively; $\varphi_{13}$, $\varphi_{32}$, and $\varphi_{21}$ are differences between the phase of the excitation signal $V_{EXC}(t)$ and the phases of the first, second, and third differential voltages $V_{13}(t)$, $V_{32}(t)$, and $V_{21}(t)$, respectively; and rotor angle θ is the angle of rotor 24 with respect to stator 26, which is the metric that is desired to be determined by synchro-demodulator 16.

Figure 2:
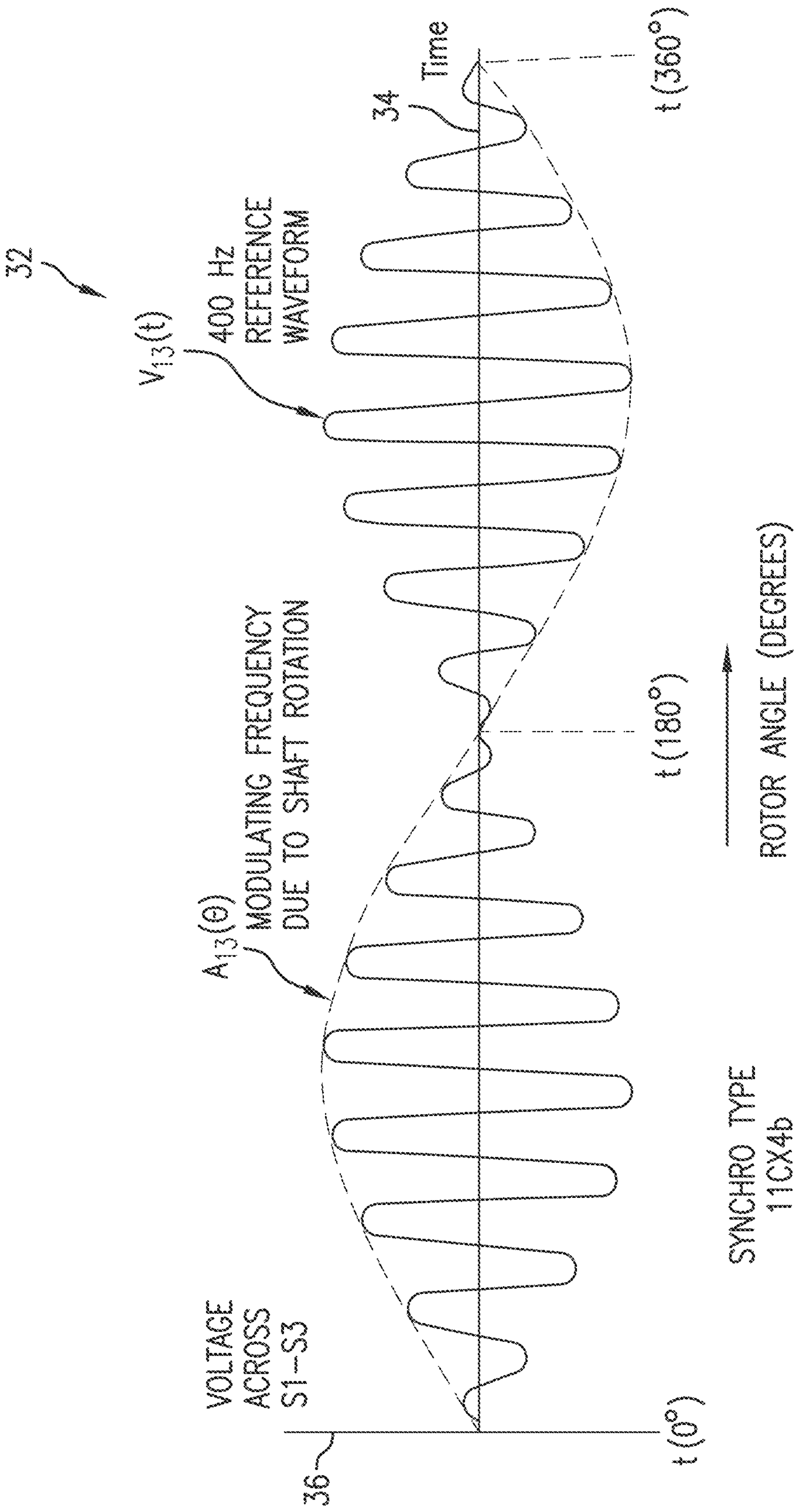
FIG. 2 is a graph of one of the three output signals provided by a three-phase synchro-resolver.

FIG. 2 is a graph of one of the three differential voltages $V_{13}(t)$, $V_{32}(t)$, and $V_{21}(t)$ provided by three-phase synchro-resolver 22. In FIG. 2, graph 32 includes horizontal axis 34, vertical axis 36 and first differential voltage $V_{13}(t)$ as expressed in equation (2) above. Horizontal axis 34 is indicative of time and vertical axis 36 is indicative of voltage. Horizontal axis 34 is scaled so as to depict first differential voltage $V_{13}(t)$ as rotor 24 is rotated through one full cycle of rotation (i.e., through rotor angles θ between 0 and 360°) at a constant rate of rotation. Also shown in graph 32 is first voltage envelope $A_{13}(\theta)$. First voltage envelope $A_{13}(\theta)$ is the voltage envelope that defines the magnitude of first differential voltage $V_{13}(t)$ as a function or rotor angle θ. Second and third differential voltages $V_{32}(t)$ and $V_{21}(t)$ similarly have voltage envelopes $A_{32}(\theta)$ and $A_{21}(\theta)$, respectively, which define the magnitude of such differential voltages:

$$A_{13} = K_1 \cdot V_1 \sin(\theta) \tag{5}$$

$$A_{32} = K_2 \cdot V_1 \sin(\theta + 120°), \text{ and} \tag{6}$$

$$A_{21} = K_3 \cdot V_1 \sin(\theta + 240°) \tag{7}$$

Figure 3:
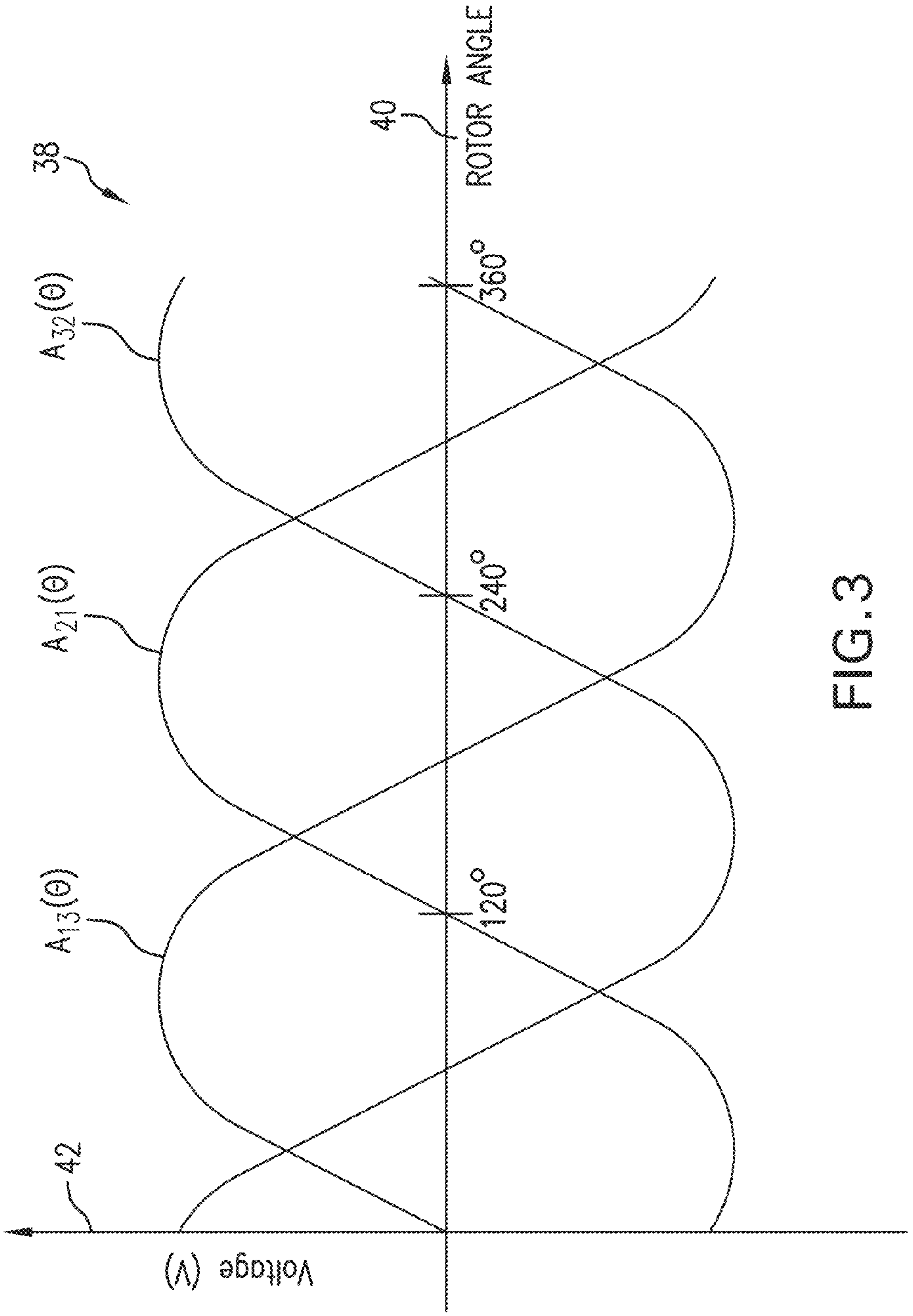
FIG. 3 is a graph depicting all three voltage envelopes corresponding to the three output signals provided by a three-phase synchro-resolver.

FIG. 3 is a graph depicting all three voltage envelopes $A_{13}(\theta)$, $A_{32}(\theta)$, and $A_{21}(\theta)$ as expressed in equations (5), (6), and (7), above. In FIG. 3, graph 38 includes horizontal axis 40, vertical axis 42 and voltage envelopes $A_{13}(\theta)$, $A_{32}(\theta)$, and $A_{21}(\theta)$. Horizontal axis 40 is indicative of rotor angle θ, and vertical axis 42 is indicative of voltage. As depicted in graph 38, each of voltage envelopes $A_{13}(\theta)$, $A_{32}(\theta)$, and $A_{21}(\theta)$ are 120° out of phase with one another. Each of the voltage envelopes $A_{13}(\theta)$, $A_{32}(\theta)$, and $A_{21}(\theta)$ are functions, which means that at any given rotor angle θ, each of voltage envelopes $A_{13}(\theta)$, $A_{32}(\theta)$, and $A_{21}(\theta)$ has a single value associated with that specific rotor angle θ. As each of voltage envelopes $A_{13}(\theta)$, $A_{32}(\theta)$, and $A_{21}(\theta)$ are sinusoids, their inverses are not functions. Thus, if any one of the voltage envelopes $A_{13}(\theta)$, $A_{32}(\theta)$, and $A_{21}(\theta)$ is known, then the rotor angle θ can only be determined to be one of two different values. If, however, any two of these three voltage envelopes $A_{13}(\theta)$, $A_{32}(\theta)$, and $A_{21}(\theta)$ can be determined, then the rotor angle θ can be uniquely determined therefrom.

Rotor angle θ is ultimately determined by taking the arctangent of a ratio of sine of rotor angle θ and the cosine of rotor angle θ:

$$\theta = \arc\tan\left(\frac{\sin(\theta)}{\cos(\theta)}\right). \quad (8)$$

Before such an inverse hyperbolic function (i.e., the arctan function) can be used for determining rotor angle θ, both the sine and cosine of the rotor angle θ must be determined. An exemplary method for determining both the sine and the cosine of the rotor angle θ will be disclosed below with reference to FIG. 4.

Coupling coefficients $K_1$, $K_2$, and $K_3$, as shown in equations (5)-(7), are approximately equal to one another for typical synchro-resolvers, such as synchro-resolver 22, as are phase differences $\varphi_1$, $\varphi_2$, and $\varphi_3$. Thus, the magnitudes of first, second, and third differential voltages $V_{13}(t)$, $V_{32}(t)$, and $V_{21}(t)$ are primarily, but not exclusively, determined by the angle θ is of rotor 24. To obtain the most precise determination of rotor angle θ, all coupling coefficients $K_1$, $K_2$, and $K_3$ and/or phase differences $\varphi_1$, $\varphi_2$, and $\varphi_3$ can also be determined. Simulations have shown, however, that errors in determining rotor angle θ that result from typical phase differences $\varphi_1$, $\varphi_2$, and $\varphi_3$ are small (e.g., an error of 1.2 arc-seconds for rotor angle θ results from a 4-degree phase difference between $\varphi_1$ and $\varphi_2$). Thus, correcting phase differences $\varphi_{13}$, $\varphi_{32}$, and $\varphi_{21}$ is not strictly necessary. Correcting differences in coupling coefficients $K_1$, $K_2$, and $K_3$ also is not strictly necessary.

Returning to FIG. 1, demodulating system 16 is configured to generate a signal indicative of a rotor angle θ based on at least two of the first, second, and/or third differential voltages $V_{13}(t)$, $V_{32}(t)$, and $V_{21}(t)$ generated by synchro-resolver 22. Although only two of these three differential voltages $V_{13}(t)$, $V_{32}(t)$, and $V_{21}(t)$ are needed to uniquely determine rotor angle θ, any two of these three differential voltages necessarily require for generation all three of the terminal voltages $V_1(t)$, $V_2(t)$, and $V_3(t)$ at the terminals of the wye-configured secondary windings 30-1, 30-2, and 30-3. Demodulating system 16 receives terminal voltages $V_1(t)$, $V_2(t)$, and $V_3(t)$ from aircraft hardware 12 vis interconnect 14. In some embodiments, one of terminal voltages $V_1(t)$, $V_2(t)$, and $V_3(t)$ can be grounded.

Demodulating system 16 includes differential amplifiers 44A-44C, Analog-to-Digital (A/D) converters 46A-46C, and processor 48, which can include program code configured to perform a method for demodulating the signals generated by synchro-resolver 22. Differential amplifier 44A is configured to generate a buffered and amplified version of excitation signal $V_{EXC}(t)$ received via interconnect 14. Differential amplifies 44B and 44C are configured to generate differential voltages $V_{31}(t)$ and $V_{21}(t)$, from terminal voltages $V_1(t)$, $V_2(t)$, and $V_3(t)$ received via interconnect 14. In the depicted embodiment, terminal voltage $V_1(t)$ is grounded. Differential voltage $V_{31}(t)$ is simply the additive inverse of differential voltage $V_{13}(t)$. A/D converter 46A receives the buffered and amplified version of excitation signal $V_{EXC}(t)$, samples it, and converts it to a digital format. A/D converters 46B and 46C receive the differential voltages $V_{31}(t)$ and $V_{21}(t)$ generated by differential amplifiers 44B and 44C, respectively. A/D converters 46A-46C sample their respective analog signals at a frequency that is higher than the frequency f of the excitation signal $V_{EXC}(t)$, typically much higher. For example, the sampling frequency of A/D converters 46A-46C can be 100 times or more than the 400 Hz frequency f of the excitation signal $V_{EXC}(t)$. Processor 48 then determines rotor angle θ using such digitized samples of the excitation signal $V_{EXC}(t)$ and the differential voltages $V_{31}(t)$ and $V_{21}(t)$ generated, as will be described in more detail below, with reference to FIG. 4.

In various embodiments, synchro-demodulator 16 can be realized using the elements illustrated in FIG. 1 or various other elements. For example, processor 48 can include any one or more of a microprocessor, a control circuit, a digital signal processor (DSP), an application specific integrated circuit (ASIC), a field-programmable gate array (FPGA), or other equivalent discrete or integrated logic circuitry. Various elements of synchro-demodulator 16 can be implemented in either hardware or software. For example, an FPGA can be configured to implement some elements in hardware and others in software. For software implemented elements, computer readable memory 50 can contain instructions that, when executed by processor 48, will cause synchro-demodulator 16 to perform operations pertaining to such elements.

Computer readable memory 50 can be configured to store information within synchro-demodulator 16 during operation. Computer readable memory 50, in some examples, is described as computer-readable storage media. In some examples, a computer-readable storage media can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer readable memory 50 is a temporary memory, meaning that a primary purpose of computer readable memory 50 is not long-term storage. Computer readable memory 50, in some examples, is described as volatile memory, meaning that computer readable memory 50 does not maintain stored contents when power to heat exchange system 30 is turned off. Examples of volatile memories can include random access memories (RAM), dynamic random-access memories (DRAM), static random-access memories (SRAM), and other forms of volatile memories. In some examples, computer readable memory 50 is used to store program instructions for execution by processor 48. Computer readable memory 50, in one example, is used by software or applications running on synchro-demodulator 16 (e.g., a software program implementing various operational functions pertaining to determining shaft angle using outputs of synchro-resolver 22) to temporarily store information during program execution, such as, for example, in data computer readable memory 50.

In some examples, computer readable memory 50 can also include one or more computer-readable storage media. Computer readable memory 50 can be configured to store larger amounts of information than volatile memory. Computer readable memory 50 can further be configured for long-term storage of information. In some examples, computer readable memory 50 includes non-volatile storage elements. Examples of such non-volatile storage elements can include magnetic hard discs, optical discs, flash memories, or forms of electrically programmable memories (EPROM) or electrically erasable and programmable (EEPROM) memories.

Figure 4:
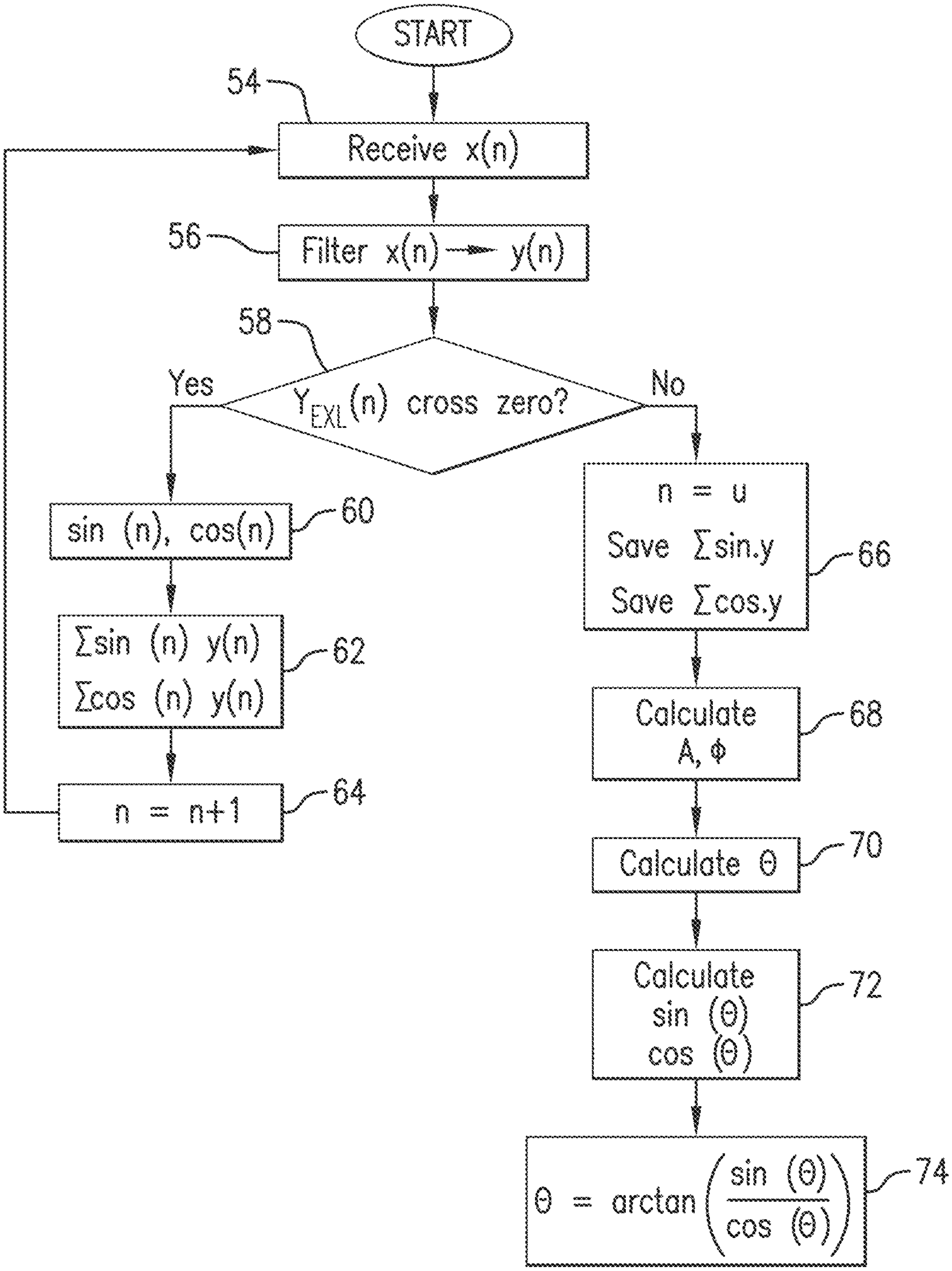
FIG. 4 is flowchart of a method for demodulating a three-phase synchro-resolver.

FIG. 4 is flow chart of one embodiment of a method for demodulating a three-phase synchro-resolver. Method 52 as depicted in FIG. 4 can be executed by processor 48, which is depicted in FIG. 3. Method 52 begins at step 54 where the processor 48 receives the next digitized sample $x_{EXC}(n)$, $x_{31}(n)$, and $x_{21}(n)$ of the excitation signal $V_{EXC}(t)$ and the differential voltages $V_{31}(t)$ and $V_{21}(t)$. Although this embodiment uses the differential voltages $V_{31}(t)$ and $V_{21}(t)$, any two of differential voltages $V_{13}(t)$, $V_{32}(t)$, and $V_{21}(t)$ can be used to determine rotor angle θ. Method 52 then advances to step 56, where processor 48 performs a digital filtering operation to generate filtered values $y_{EXC}$(n), $y_{31}$(n), and $y_{21}$(n) of the digitized samples $x_{EXC}$(n), $x_{31}$(n), and $x_{21}$(n). Various types of digital filtering can be performed, such as for example, various finite response filtering and infinite response filtering as are known in the art. Then, at step 58 processor 48 determines whether the excitation signal $V_{EXC}$ (t) has made a negative-to-positive zero crossing (i.e., whether $y_{EXC}$(n) has become positive after a previous negative value $y_{EXC}$(n−1)). Step 56 is used to determine at which sampling of the excitation signal $V_{EXC}$(t), has a last period of the excitation signal $V_{EXC}$(t) ended and a new period of the excitation signal $V_{EXC}$(t) begun.

If, at step 58, processor 48 determines that excitation signal $V_{EXC}$(t) has not crossed from a negative voltage to a positive voltage (i.e., a new period of the excitation signal $V_{EXC}$(t) has not begun and a last period of the excitation signal $V_{EXC}$(t) has not ended), then method 52 advances to step 60 where processor 48 synthesizes sine and cosine values of the phase of the excitation signal $V_{EXC}$(t) period at which the last samples were obtained. The phase of the excitation signal $V_{EXC}$(t) period is given by:

$$\text{phase} = 2\pi\frac{n}{n_{max}}. \tag{9}$$

In some embodiments, processor 48 synthesizes the sine and cosine values of this phase using a lookup table. Such a lookup table can be used if the number of samples $n_{max}$ that are obtained in a period of the excitation signal $V_{EXC}$(t) is known. Method 52 advances from step 60 to step 62, where processor 48 multiplies each of the digitized and filtered samples y(n) by each of the sine and cosine values of the phase and then adds such a product to the running sums:

$$\text{sum}_{sine} = \text{sum}_{sine} + y(n)\sin(\text{phase}),\ \text{and} \tag{10}$$

$$\text{sum}_{cosine} = \text{sum}_{cosine} + y(n)\cos(\text{phase}), \tag{11}$$

Where such a $\text{sum}_{sine}$ and $\text{sum}_{cosine}$ is accumulated for the digitized and filtered sampling for each of the excitation signal $V_{EXC}$(t) and the differential voltages $V_{31}$(t) and $V_{21}$(t) (i.e., for $y_{EXC}$(n), $y_{31}$(n), and $y_{21}$(n)).

This summing of the product of the digitized and filtered samples and the sine and cosine of the phase performs a convolution of the signals with each of the sine and cosine functions of the phase. All three of the excitation signal $V_{EXC}$(t) and the differential voltages $V_{31}$(t) and $V_{21}$(t) are approximately in phase with the sine function of the phase, differing in phase therefrom only by phase differences, such as phase differences $\varphi_E$XC, $\varphi_{32}$, and $\varphi_{21}$. Thus, one would expect the magnitudes of the $\text{sum}_{sine}$ values to be much larger than the magnitudes of the $\text{sum}_{cosine}$ values. Method 52 advances from step 62 to step 64, where the sample index is advanced (i.e., n=n+1). Method 52 then returns to step 54, where the processor 48 receives the next digitized sample $x_{EXC}$(n), $x_{31}$(n), and $x_{21}$(n) of the excitation signal $V_{EXC}$(t) and the differential voltages $V_{31}$(t) and $V_{21}$(t).

If, however, at step 58, processor 48 determines that excitation signal $V_{EXC}$(t) has crossed from a negative voltage to a positive voltage (i.e., a new period of the excitation signal $V_{EXC}$(t) has begun and a last period of the excitation signal $V_{EXC}$(t) has ended), then method 52 advances to step 66 where processor 48 performs operations pertaining to the conclusion of the last period of the excitation signal $V_{EXC}$(t). At step 66, processor 48 saves the sums of the sine and cosine corresponding to each of the excitation signal $V_{EXC}$(t) and the differential voltages $V_{31}$(t) and $V_{21}$(t) (i.e., saves $\text{sum}_{sine}$ and $\text{sum}_{cosine}$ for each of the excitation signal $V_{EXC}$ (t) and the differential voltages $V_{31}$(t) and $V_{21}$(t)). In some embodiments, at step 66 processor can save the sample number n as the maximum number of samples $n_{max}$ obtained during the last period of the excitation signal $V_{EXC}$(t). At step 66, processor 48 also initializes the sample number n=0 within the period and the next sums of the sine and cosine corresponding to each of the excitation signal $V_{EXC}$(t) and the differential voltages $V_{31}$(t) and $V_{21}$(t) (i.e., sets summing accumulators to zero).

Method 52 advances from step 66 to step 68 where the stored values of $\text{sum}_{sine}$ and $\text{sum}_{cosine}$ are used to obtain amplitude and phase difference for each of the excitation signal $V_{EXC}$(t) and the differential voltages $V_{31}$(t) and $V_{21}$ (t). Such amplitudes and phase differences are calculated as follows:

$$|A| = \frac{2}{n_{max}}\sqrt{\text{sum}_{sine}^2 + \text{sum}_{cosine}^2}, \tag{12}$$

$$A_{mn} = |A_{mn}|\,\text{sign}(\text{sum}_{sine}),\ \text{and} \tag{13}$$

$$\varphi_{mn} = \arctan\left(\frac{\text{sum}_{cosine}}{\text{sum}_{sine}}\right). \tag{14}$$

Method 52 then advances from step 68 to step 70 where processor 48 calculates the sine and cosine of shaft angle θ. Such operations are performed as follows:

$$\sin(\theta) = \frac{A_{31}}{K_1 \cdot V_1}\ \text{and} \tag{15}$$

$$\cos(\theta) = \frac{2}{\sqrt{3}}\left(\frac{A_{31}}{2K_2 \cdot V_1} + \frac{A_{21}}{K_1 \cdot V_1}\right), \tag{16}$$

where, in some embodiments, coupling coefficients $K_1$ and $K_2$ can be determined at a time of startup or at a time of calibration. In other embodiments, $K_1$ and $K_2$ are considered to be approximately equal to one another ($K_1$=$K_2$=K). Method 50 then advances from step 70 to step 72 where processor 48 calculates the shaft angle θ based on these sine and cosine values. Such operations are performed as follows:

$$\theta = \arctan\left(\frac{\sin(\theta)}{\cos(\theta)}\right). \tag{17}$$

In another embodiment, instead of convolving differential voltages $V_{31}$(t) and $V_{21}$(t) with both the sine and cosine waves which are synthesized in phase relation with the excitation signal $V_{EXC}$(t), sinusoidal waves can be synthesized in phase relation with each of differential voltages $V_{31}$(t) and $V_{21}$(t). Because such synthesized sinusoids are in phase relation with each of differential voltages $V_{31}$(t) and $V_{21}$(t), quadrature sinusoids (e.g., cosine waves) need not be synthesized, as convolution of such quadrature sinusoids with differential voltages $V_{31}$(t) and $V_{21}$(t) would yield zero values. The amplitudes $A_{31}$ and $A_{21}$ would be the direct result of such convolutions of phase related sinusoids (i.e., sinusoids in phase with differential voltages $V_{31}(t)$ and $V_{21}(t)$).

To generate such phase-related sinusoidal waves, processor 48 would detect the zero-crossings of each of differential voltages $V_{31}(t)$ and $V_{21}(t)$. Such detected zero-crossings would be those corresponding to the negative-positive zero crossing of excitation signal $V_{EXC}(t)$. Such corresponding zero-crossings typically would be the zero crossings that are most temporally close to one another. Zero crossings of differential voltages $V_{31}(t)$ and $V_{21}(t)$, which correspond to the negative-to-positive zero crossings of excitation signal $V_{EXC}(t)$, can be either negative-to-positive type of zero crossing or positive-to-type of zero crossing. If the zero crossing of differential voltages $V_{31}(t)$ and $V_{21}(t)$ is such a positive-to-negative type of zero crossing, the amplitude of $A_{31}$ and/or $A_{21}$ would be made negative, as would be appropriate.

Figure 5:
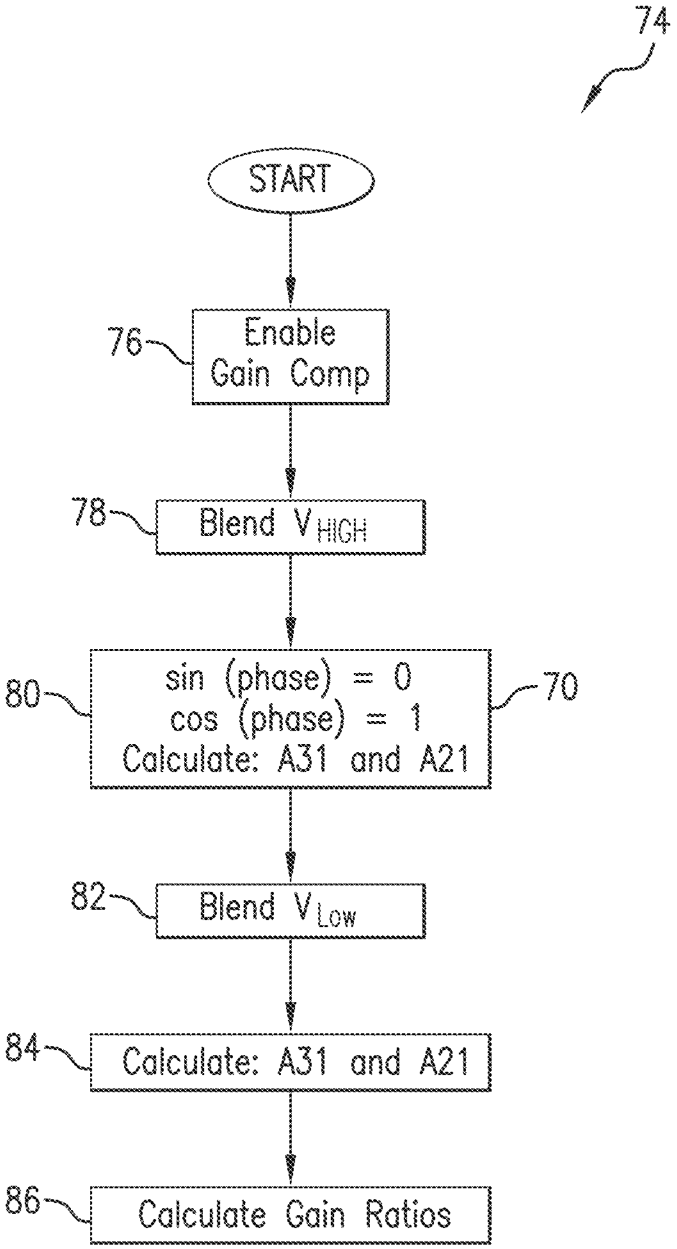
FIG. 5 is a flowchart of a method for normalizing the gain in the channels corresponding to each of the differential voltages $V_{31}(t)$ and $V_{21}(t)$.

FIG. 5 is a flowchart of a method for normalizing the gain in the channels corresponding to each of the differential voltages $V_{31}(t)$ and $V_{21}(t)$. In FIG. 5 method 74 begins at step 76 where processor 48 enables gain compensation. Method 74 advances to step 78 where a first DC voltage $V_{high}$ is blended into the differential voltages $V_{31}(t)$ and $V_{21}(t)$:

$$V_{31\_BIT(high)} = kV_{31} + (1-k)V_{high} \tag{18}$$

$$V_{21\_BIT(high)} = kV_{21} + (1-k)V_{high} \tag{19}$$

Method 74 then advances to step 80, where processor sets sin(phase)=0 and cos(phase)=1 and determines the amplitudes $A_{31}$ and $A_{21}$ as explained above. By setting the sin (phase)=0, the $sum_{sine}$ will accumulate to zero over a period of the excitation signal, and by setting the cos(phase)=1, the $kV_{31}$ and $kV_{21}$ portions of the waveforms will integrate to zero, as these portions are AC portions, while the $sum_{cosine}$ will be indicative of the response to the $V_{high}$ signal blended into the $V_{31}$ and $V_{21}$ channels. Method 74 then advances to step 82 where a second DC voltage $V_{low}$ is blended into the differential voltages $V_{31}(t)$ and $V_{21}(t)$:

$$V_{31\_BIT(low)} = kV_{31} + (1-k)V_{low} \tag{20}$$

$$V_{21\_BIT(low)} = kV_{21} + (1-k)V_{low} \tag{21}$$

where k is a fraction $0<k<1$. Method 74 then advances to step 84, where processor retains sin(phase)=0 and cos (phase)=1 and determines the amplitudes $A_{31}$ and $A_{21}$ as explained above. By setting the sin(phase)=0, the $sum_{sine}$ will accumulate to zero over a period of the excitation signal, and by setting the cos(phase)=1, the $sum_{cosine}$ will be indicative of the response to the $V_{high}$ signal blended into the $V_{31}$ and $V_{21}$ channels.

Method 74 advances to step 86 where processor 48 calculates a ratio of the gains of the two channels based upon the above four responses as indicated in equations (18)-(22) can be used to normalize the response of each of these two data paths. The ratio of the gains of these two data paths is given by:

$$\frac{A_{31}}{A_{21}} = \frac{V_{31\_BIT(high)} - V_{31\_BIT(low)}}{V_{21\_BIT(high)} - V_{21\_BIT(low)}} \tag{22}$$

Method 74 then advances to step 90, where processor 48 normalizes the gains of the two channels based upon the ratio obtained in equation (22).

Figure 6:
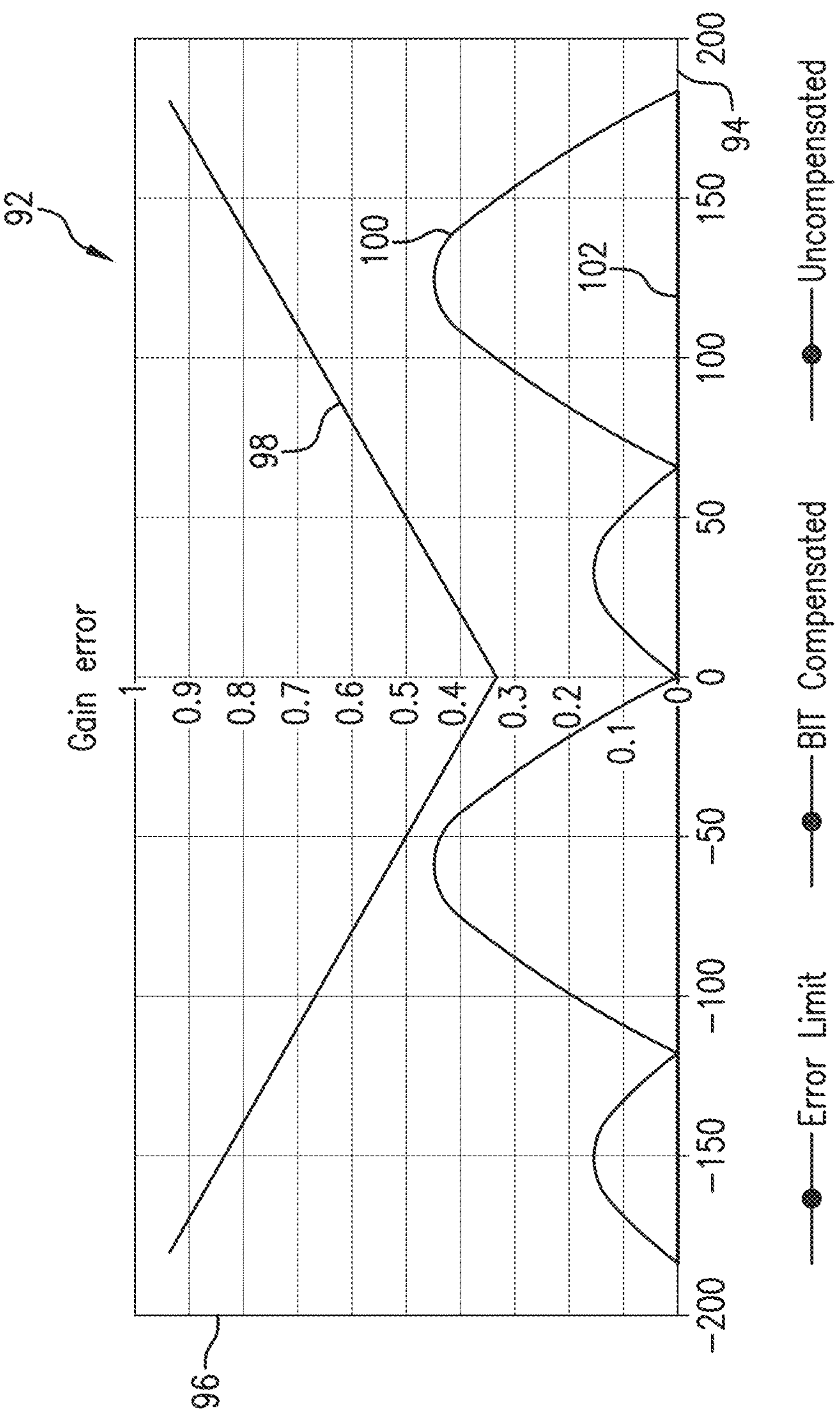
FIG. 6 is a graph of gain error as a function of rotor angle $\theta$.

FIG. 6 is a graph of gain error as a function of rotor angle θ. In FIG. 6 graph 92 includes horizontal axis 94, vertical axis 96, specified gain error limit 98, uncompensated gain error 100 and compensated gain error 102. Horizontal axis 94 is indicative of rotor angle θ. Vertical axis 96 is indicative of gain error. Specified gain error limit 98 indicates a maximum gain error that demodulating system 16 (depicted in FIG. 1) can tolerate and still be able to determine rotor angle θ within a predetermined specification. Uncompensated gain error 100 indicates the gain error of demodulating system 16, which has not compensated for different gains of the $V_{31}$ and $V_{21}$ channels. Compensated gain error 102 indicates the gain error of demodulating system 16, which has compensated for different gains of the $V_{31}$ and $V_{21}$ channels.

DISCUSSION OF POSSIBLE EMBODIMENTS

The following are non-exclusive descriptions of possible embodiments of the present invention.

Some embodiments relate to a method for generating a signal indicative of a shaft angle of a synchro-resolver. In the method, a first differential signal induced between a first output terminal and a second output terminal of a three-phase secondary winding of the synchro-resolver is convolved with a first sine wave having a period and a phase equal to a period and phase of the first differential signal, thereby generating a first convolution result. The magnitude of the first differential signal is then used as a measure of a sine of the shaft angle. A second differential signal induced between the first output terminal and a third output terminal of a three-phase secondary winding of the synchro-resolver is convolved with a first sine wave having a period and a phase equal to a period and phase of the first differential signal, thereby generating a first convolution result. A magnitude of the first differential signal is then determined based on the first convolution result. A measure of a cosine of the shaft angle is created based on a weighted sum of the measures of the magnitudes of the first and second differential signals. The shaft angle is then determined based on the measures of the sine and cosine of the shaft angle.

The method of the preceding paragraph can optionally include, additionally and/or alternatively, any one or more of the following features, configurations, and/or additional components:

A further embodiment of the foregoing method can further include providing the excitation signal to primary windings of the synchro-resolver.

A further embodiment of any of the foregoing methods, wherein determining the magnitude of the first differential signal induced between the first output terminal and the second output terminal of the three-phase secondary winding of the synchro-resolver can include: i) determining a zero-crossing of the first differential signal; ii) synthesizing a sine wave based on zero-crossing of the first differential signal, the sine wave having a period and a phase equal to a period and phase of the first differential signal; and iii) convolving the synthesized sine wave with the first differential signal induced between the first output terminal and the second output terminal of the three-phase secondary winding of the synchro-resolver, thereby determining a magnitude the first differential signal.

A further embodiment of any of the foregoing methods, wherein determining the magnitude of the second differential signal induced the first output terminal and the third output terminal of the three-phase secondary winding of the synchro-resolver can include: i) determining a zero-crossing of the second differential signal; ii) synthesizing a sine wave based on zero-crossing of the second differential signal, the sine wave having a period and a phase equal to a period and phase of the second differential signal; and iii) convolving the synthesized sine wave with the second differential signal induced between the first output terminal and the third output terminal of the three-phase secondary winding of the synchro-resolver, thereby determining a magnitude the second differential signal.

A further embodiment of any of the foregoing methods, wherein creating a measure of a cosine of the shaft angle based on a weighted sum of the measures of the magnitudes of the first and second differential signals can include weighting the magnitude of the first differential signal half as much as the magnitude of the second differential signal.

A further embodiment of any of the foregoing methods, wherein determining the shaft angle based on the measures of the sine and cosine of the shaft angle can further include taking a ratio of the measures of the sine and cosine of the shaft angle.

A further embodiment of any of the foregoing methods, wherein determining the shaft angle based on the measures of the sine and cosine of the shaft angle can further include taking the arctangent of the ratio of the measures of the sine and cosine of the shaft angle.

A further embodiment of any of the foregoing methods, wherein the measure of the shaft angle can be determined for each period of the excitation signal.

A further embodiment of any of the foregoing methods can further include normalizing magnitudes of the first and second differential signals based on first and second DC voltages blended into each of the first and second differential voltages.

A further embodiment of any of the foregoing methods, wherein the magnitudes of the first and second differential signals can be normalized by: i) setting the synthesized cosine signal to unity; ii) setting the synthesized sine signal to zero; iii) determining magnitude of the first and second differential signals for each of the first and second DC voltages blended thereinto; iv) determining gain of the first differential signal based on a difference in the magnitudes of the first differential signal for each of the blended DC voltages; and v) determining gain of the second differential signal based on a difference in the magnitudes of the second differential signal for each of the blended DC voltages.

Some embodiments relate to a synchro-demodulator for generating a signal indicative of a shaft angle of a three-phase synchro-resolver. the synchro-demodulator includes a first analog-to-digital (A/D) converter that receives a first voltage differential between a first output terminal of first secondary windings of the three-phase synchronous resolver and a second output terminal of second secondary windings of the three-phase synchro-resolver. The first A/D converter is further configured to generate a first digitized sampling of the first voltage differential. The synchro-demodulator includes a second A/D converter that receives a second voltage differential between the first output terminal of first secondary windings of the three-phase synchronous resolver and a third output terminal of third secondary windings of the three-phase synchro-resolver. The second A/D converter is further configured to generate a second digitized sampling of the second voltage differential. The synchro-demodulator includes a processor configured to receive the first and second digitized samplings. The synchro-demodulator also includes computer readable memory containing instructions that, when executed by the processor cause the synchro-demodulator to: i) convolving a first differential signal induced between a first output terminal and a second output terminal of a three-phase secondary winding of the synchro-resolver with a first sine wave having a period and a phase equal to a period and phase of the first differential signal, thereby generating a first convolution result; ii) determine a magnitude of the first differential signal based on the first convolution result; iii) use the magnitude of the first differential signal as a measure of sine of the shaft angle; iv) convolving a second differential signal induced between the first output terminal and a third output terminal of a three-phase secondary winding of the synchro-resolver with a second sine wave having a period and a phase equal to a period and phase of the second differential signal, thereby generating a first convolution result; v) determine a magnitude of the first differential signal based on the second convolution result; vi) create a measure of a cosine of the shaft angle based on a weighted sum of the measures of the magnitudes of the first and second differential signals; and vii) determine the shaft angle based on the measures of the sine and cosine of the shaft angle.

The synchro-demodulator of the preceding paragraph can optionally include, additionally and/or alternatively, any one or more of the following features, configurations, and/or additional components:

A further embodiment of the foregoing synchro-demodulator can further include a third A/D converter that receives a voltage signal of an excitation signal provided to primary windings of the synchro-resolver, the third A/D converter further configured to generate a third digitized sampling of the excitation signal.

A further embodiment of any of the foregoing synchro-demodulators, wherein determining the magnitude of the first differential signal induced between the first output terminal and the second output terminal of the three-phase secondary winding of the synchro-resolver can include: i) determining a zero-crossing of the first differential signal; ii) synthesizing a sine wave based on zero-crossing of the first differential signal, the sine wave having a period and a phase equal to a period and phase of the first differential signal; and iii) convolving the synthesized sine wave with the first differential signal induced between the first output terminal and the second output terminal of the three-phase secondary winding of the synchro-resolver, thereby determining a magnitude the first differential signal.

A further embodiment of any of the foregoing synchro-demodulators, wherein determining the magnitude of the second differential signal induced the first output terminal and the third output terminal of the three-phase secondary winding of the synchro-resolver can include: i) determining a zero-crossing of the second differential signal; ii) synthesizing a sine wave based on zero-crossing of the second differential signal, the sine wave having a period and a phase equal to a period and phase of the second differential signal; and iii) convolving the synthesized sine wave with the second differential signal induced between the first output terminal and the third output terminal of the three-phase secondary winding of the synchro-resolver, thereby determining a magnitude the second differential signal.

A further embodiment of any of the foregoing synchro-demodulators, wherein creating a measure of a cosine of the shaft angle based on a weighted sum of the measures of the magnitudes of the first and second differential signals can include weighting the magnitude of the first differential signal half as much as the magnitude of the second differential signal.

A further embodiment of any of the foregoing synchro-demodulators, wherein determining the shaft angle based on the magnitude of the first and second differential signals further can include taking a ratio of the measures of the sine and cosine of the shaft angle.

A further embodiment of any of the foregoing synchro-demodulators, wherein determining the shaft angle based on the magnitude of the first and second differential signals further can include taking the arctangent of the ratio of the measures of the sine and cosine of the shaft angle.

A further embodiment of any of the foregoing synchro-demodulators, wherein the measure of the shaft angle can be determined for each period of the excitation signal.

A further embodiment of any of the foregoing synchro-demodulators, wherein the computer readable memory can contain further instructions that, when executed by the processor cause the synchro-demodulator to normalize magnitudes of the first and second differential signals based on first and second DC voltages blended into each of the first and second differential voltages.

A further embodiment of any of the foregoing synchro-demodulators, wherein the magnitudes of the first and second differential signals are normalized by: i) setting the synthesized cosine signal to unity; ii) setting the synthesized sine signal to zero; iii) determining magnitude of the first and second differential signals for each of the first and second DC voltages blended thereinto; iv) determining gain of the first differential signal based on a difference in the magnitudes of the first differential signal for each of the blended DC voltages; and v) determining gain of the second differential signal based on a difference in the magnitudes of the second differential signal for each of the blended DC voltages.

It will be recognized that the invention is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A method for generating a signal indicative of a shaft angle of a synchro-resolver, the method comprising:

receiving, by a first analog-to-digital (A/D) converter, a first voltage differential between a first output terminal of first secondary windings of a three-phase synchronous resolver and a second output terminal of second secondary windings of the three-phase synchro-resolver;

generating, by the first A/D converter, a first digitized sampling of the first voltage differential;

convolving a first differential signal induced between the first output terminal and the second output terminal of a three-phase secondary winding of the synchro-resolver with a first sine wave having a period and a phase equal to a period and phase of the first differential signal, thereby generating a first convolution result;

determining a magnitude of the first differential signal based on the first convolution result;

using the magnitude of the first differential signal as a measure of a sine of the shaft angle;

receiving, by a second A/D converter, a second voltage differential between the first output terminal of the first secondary windings of the three-phase synchronous resolver and a third output terminal of third secondary windings of the three-phase synchro-resolver;

generating, by the second A/D converter, a second digitized sampling of the second voltage differential;

convolving a second differential signal induced between the first output terminal and the third output terminal of a three-phase secondary winding of the synchro-resolver with a second sine wave having a period and a phase equal to a period and phase of the second differential signal, thereby generating a second convolution result;

determining a magnitude of the second differential signal based on the second convolution result;

creating a measure of a cosine of the shaft angle based on a weighted sum of the measures of the magnitudes of the first and second differential signals; and determining the shaft angle based on the measures of the sine and cosine of the shaft angle.

2. The method of claim 1, further comprising:

providing a sinusoidal excitation signal to primary windings of the synchro-resolver.

3. The method of claim 2, wherein the measure of the shaft angle is determined for each period of the excitation signal.

4. The method of claim 1, wherein determining the magnitude of the first differential signal induced between the first output terminal and the second output terminal of the three-phase secondary winding of the synchro-resolver includes:

determining a zero-crossing of the first differential signal;

synthesizing a sine wave based on zero-crossing of the first differential signal, the sine wave having a period and a phase equal to a period and phase of the first differential signal; and convolving the synthesized sine wave with the first differential signal induced between the first output terminal and the second output terminal of the three-phase secondary winding of the synchro-resolver, thereby determining a magnitude the first differential signal.

5. The method of claim 1, wherein determining the magnitude of the second differential signal induced the first output terminal and the third output terminal of the three-phase secondary winding of the synchro-resolver includes:

determining a zero-crossing of the second differential signal;

synthesizing a sine wave based on the zero-crossing of the second differential signal, the sine wave having a period and a phase equal to a period and phase of the second differential signal; and convolving the synthesized sine wave with the second differential signal induced between the first output terminal and the third output terminal of the three-phase secondary winding of the synchro-resolver, thereby determining a magnitude the second differential signal.

6. The method of claim 1, wherein creating a measure of a cosine of the shaft angle based on a weighted sum of the measures of the magnitudes of the first and second differential signals comprises:

weighting the magnitude of the first differential signal half as much as the magnitude of the second differential signal.

7. The method of claim 1, wherein determining the shaft angle based on the measures of the sine and cosine of the shaft angle further comprises:

taking a ratio of the measures of the sine and cosine of the shaft angle.

8. The method of claim 7, wherein determining the shaft angle based on the measures of the sine and cosine of the shaft angle further comprises:

taking the arctangent of the ratio of the measures of the sine and cosine of the shaft angle.

9. The method of claim 1, further comprising:

normalizing magnitudes of the first and second differential signals based on first and second DC voltages blended into each of the first and second differential voltages.

10. The method of claim 9, wherein the magnitudes of the first and second differential signals are normalized by:

setting the synthesized cosine signal to unity;

setting the synthesized sine signal to zero;

determining magnitude of the first and second differential signals for each of the first and second DC voltages blended thereinto;

determining gain of the first differential signal based on a difference in the magnitudes of the first differential signal for each of the blended DC voltages; and determining gain of the second differential signal based on a difference in the magnitudes of the second differential signal for each of the blended DC voltages.

11. A synchro-demodulator for generating a signal indicative of a shaft angle of a three-phase synchro-resolver, the synchro-demodulator comprising:

a first analog-to-digital (A/D) converter that receives a first voltage differential between a first output terminal of first secondary windings of the three-phase synchronous resolver and a second output terminal of second secondary windings of the three-phase synchro-resolver, the first A/D converter further configured to generate a first digitized sampling of the first voltage differential;

a second A/D converter that receives a second voltage differential between the first output terminal of first secondary windings of the three-phase synchronous resolver and a third output terminal of third secondary windings of the three-phase synchro-resolver, the second A/D converter further configured to generate a second digitized sampling of the second voltage differential;

a processor configured to receive the first and second digitized samplings; and computer readable memory containing instructions that, when executed by the processor cause the synchro-demodulator to:

convolve a first differential signal induced between a first output terminal and a second output terminal of a three-phase secondary winding of the synchro-resolver with a first sine wave having a period and a phase equal to a period and phase of the first differential signal, thereby generating a first convolution result;

determine a magnitude of the first differential signal based on the first convolution result;

use the magnitude of the first differential signal as a measure of a sine of the shaft angle;

convolve a second differential signal induced between the first output terminal and a third output terminal of a three-phase secondary winding of the synchro-resolver with a second sine wave having a period and a phase equal to a period and phase of the second differential signal, thereby generating a second convolution result;

determine a magnitude of the second differential signal based on the second convolution result;

create a measure of a cosine of the shaft angle based on a weighted sum of the measures of the magnitudes of the first and second differential signals; and determine the shaft angle based on the measures of the sine and cosine of the shaft angle.

12. The synchro-demodulator of claim 11, further comprising:

a third A/D converter that receives a voltage signal of an excitation signal provided to primary windings of the synchro-resolver, the third A/D converter further configured to generate a third digitized sampling of the excitation signal.

13. The synchro-demodulator of claim 12, wherein the measure of the shaft angle is determined for each period of the excitation signal.

14. The synchro-demodulator of claim 11, wherein determining the magnitude of the first differential signal induced between the first output terminal and the second output terminal of the three-phase secondary winding of the synchro-resolver includes:

determining a zero-crossing of the first differential signal;

synthesizing a sine wave based on zero-crossing of the first differential signal, the sine wave having a period and a phase equal to a period and phase of the first differential signal; and convolving the synthesized sine wave with the first differential signal induced between the first output terminal and the second output terminal of the three-phase secondary winding of the synchro-resolver, thereby determining a magnitude the first differential signal.

15. The synchro-demodulator of claim 14, wherein determining the magnitude of the second differential signal induced the first output terminal and the third output terminal of the three-phase secondary winding of the synchro-resolver includes:

determining a zero-crossing of the second differential signal;

synthesizing a sine wave based on zero-crossing of the second differential signal, the sine wave having a period and a phase equal to a period and phase of the second differential signal; and convolving the synthesized sine wave with the second differential signal induced between the first output terminal and the third output terminal of the three-phase secondary winding of the synchro-resolver, thereby determining a magnitude the second differential signal.

16. The synchro-demodulator of claim 11, wherein creating a measure of a cosine of the shaft angle based on the weighted sum of the measures of the magnitudes of the first and second differential signals comprises:

weighting the magnitude of the first differential signal half as much as the magnitude of the second differential signal.

17. The synchro-demodulator of claim 11, wherein determining the shaft angle based on the measures of the sine and cosine of the shaft angle further comprises:

taking a ratio of the measures of the sine and cosine of the shaft angle.

18. The synchro-demodulator of claim 17, wherein determining the shaft angle based on the measures of the sine and cosine of the shaft angle further comprises:

taking the arctangent of the measures of the sine and cosine of the shaft angle.

19. The synchro-demodulator of claim 11, wherein the computer readable memory contains further instructions that, when executed by the processor cause the synchro-demodulator to:

normalize magnitudes of the first and second differential signals based on first and second DC voltages blended into each of the first and second differential voltages.

20. The synchro-demodulator of claim 19, wherein the magnitudes of the first and second differential signals are normalized by:

setting the synthesized cosine signal to unity;

setting the synthesized sine signal to zero;

determining magnitude of the first and second differential signals for each of the first and second DC voltages blended thereinto;

determining gain of the first differential signal based on a difference in the magnitudes of the first differential signal for each of the blended DC voltages; and determining gain of the second differential signal based on a difference in the magnitudes of the second differential signal for each of the blended DC voltages.

* * * * *